Aug. 12, 1947.    R. F. RUTHRUFF    2,425,398
MANUFACTURE OF PHTHALIC ANHYDRIDE
Filed April 17, 1942    2 Sheets-Sheet 1
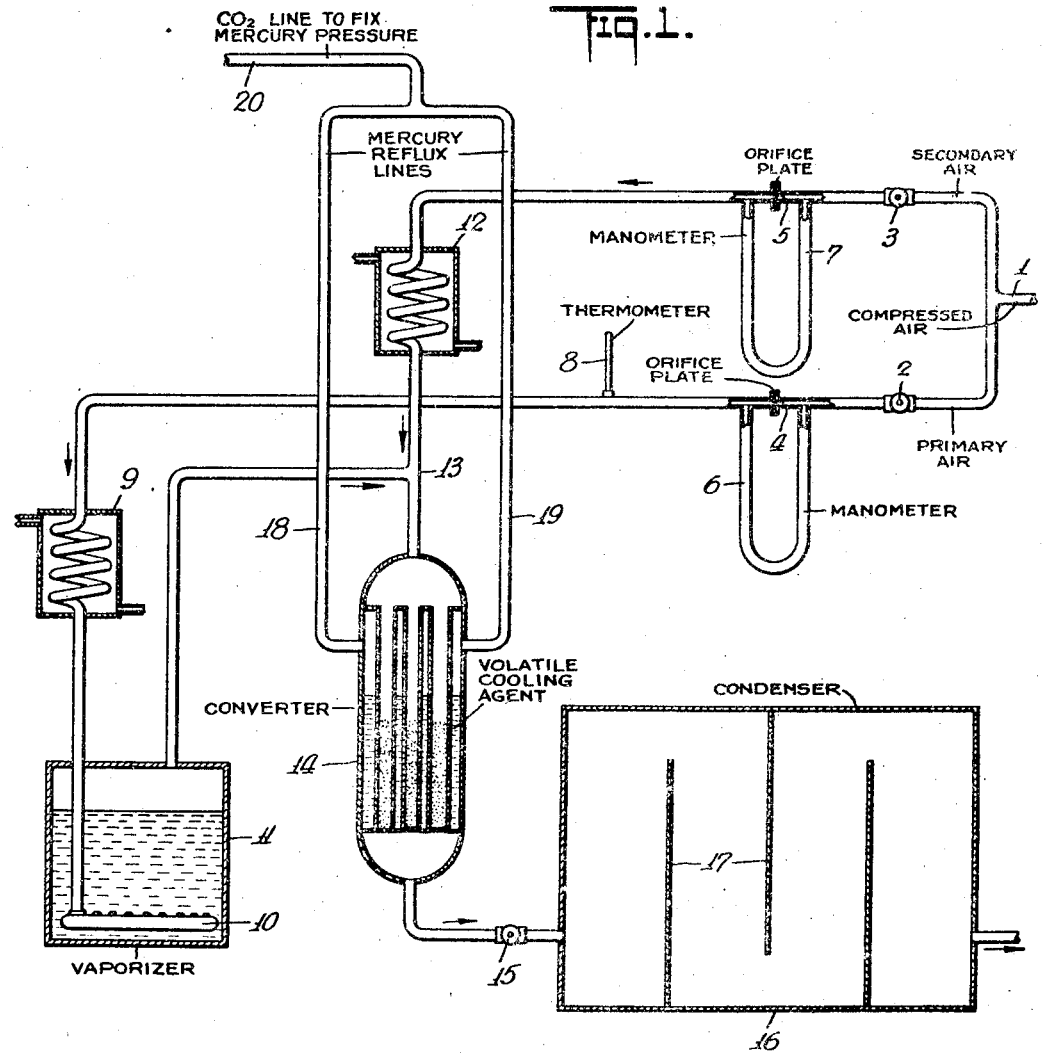
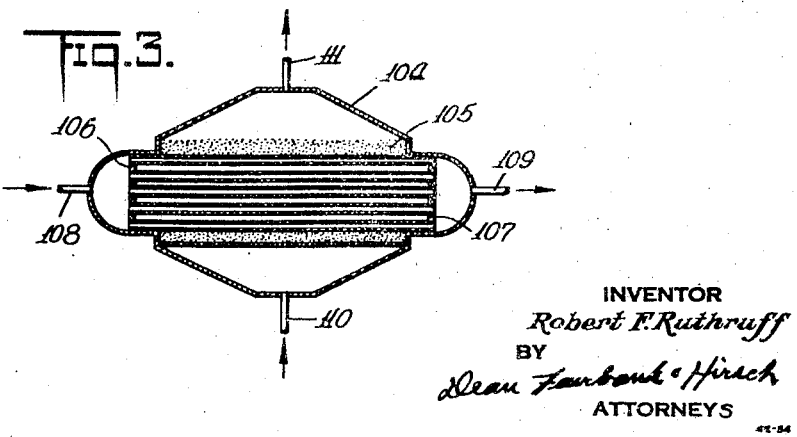
INVENTOR
Robert F. Ruthruff
BY
Dean Fairbank & Hirsch
ATTORNEYS

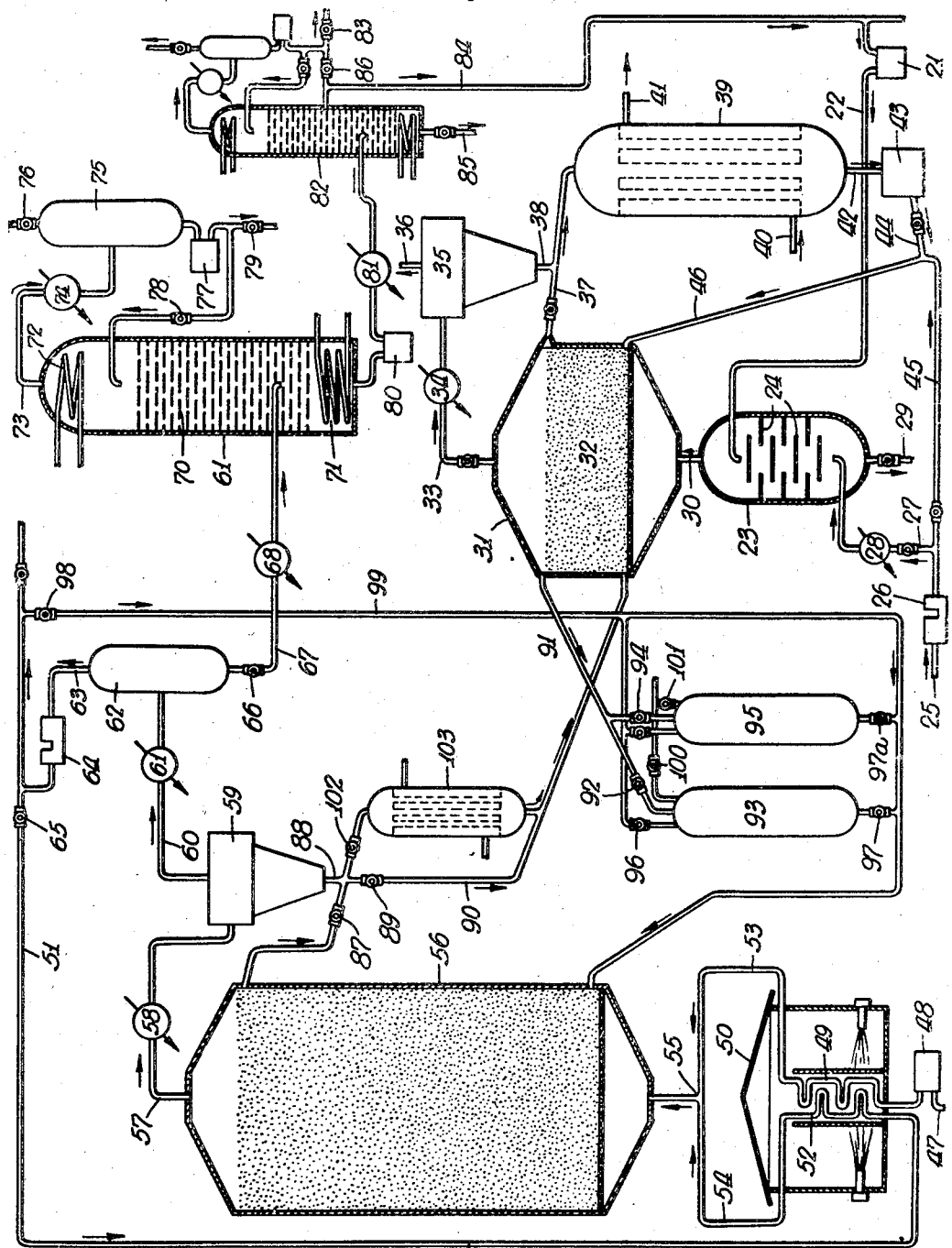

Patented Aug. 12, 1947

2,425,398

UNITED STATES PATENT OFFICE 2,425,398

MANUFACTURE OF PHTHALIC ANHYDRIDE

Robert F. Ruthruff, Chicago, Ill., assignor to The Sherwin-Williams Company, Cleveland, Ohio, a company of Ohio Application April 17, 1942, Serial No. 439,336

2 Claims. (Cl. 260—342.5)

This invention relates to the manufacture of phthalic anhydride by the partial catalytic oxidation of polyalkylated naphthalenes. Still more particularly, this invention relates to the manufacture of phthalic anhydride by the partial catalytic oxidation of dimethyl naphthalenes. In one specific embodiment thereof, this invention relates to the manufacture of phthalic anhydride by the partial catalytic oxidation of the portion of catalytically aromatized heavy naphtha rich in dimethyl naphthalenes.

The manufacture of phthalic anhydride by the vapor phase partial catalytic oxidation of naphthalene is generally familiar to those skilled in the art. In this process, naphthalene, usually naphthalene having a solidification point of 78° C. or better, is vaporized by a stream of heated air and the mixture is passed at elevated temperatures over a suitable catalyst. The reaction products are partially cooled and are then passed through a condenser, usually in the form of a large box like structure, wherein the phthalic anhydride is deposited in the form of long, needle-like crystals. The crude phthalic anhydride, usually exhibiting a solidification point in the neighborhood of 127° C. may be purified by vacuum distillation, if desired.

In the above process a considerable excess of air over that theoretically required to convert naphthalene to phthalic anhydride is employed, for example, 25 to 30 pounds of air per pound of naphthalene charged against theoretical requirements of about 5 pounds of air per pound of naphthalene. This large amount of air serves several useful purposes. Among these may be mentioned:

1. A naphthalene-air mixture too lean to burn is obtained, thus eliminating the possibility of explosions, and 2. The large amount of air serves to remove a considerable portion of the high heat of reaction and thus facilitates temperature control.

Any one of a large number of contact agents may be employed to catalytically effect the oxidation of naphthalene by air to phthalic anhydride. The active ingredient of the most widely used catalyst for the process is vanadium pentoxide. This material is usually mounted on some support such as pumice, kieselguhr, asbestos, aluminum turnings, granulated aluminum, alundum, activated alumina or the like. The activity of the catalyst may be regulated by adding small amounts of oxides of one or more of the metals molybdenum, tungsten, chromium, uranium, cerium, manganese, copper, cobalt, magnesium and calcium. Among examples of such mixed catalysts may be mentioned 85% vanadium oxide plus 15% molybdenum oxide, 65% vanadium oxide plus 30% molybdenum oxide and 5% potassium oxide (added as the sulfate).

Molybdenum oxide is also an excellent catalyst for promoting the oxidation of naphthalene. This material may also be mounted on supports and modified by the addition of other oxides much as has already been described with respect to vanadium oxide. Bismuth vanadate and even more especially tin vanadate are highly active contact agents for promoting the oxidation of naphthalene. Obviously, from one point of view, these catalysts may be considered as vanadium oxide modified with bismuth oxide and tin oxide respectively.

Operating temperatures depend to a greater or lesser degree upon the exact nature of the catalytic agent employed and other factors such as contact time, naphthalene to air ratio and the like. In general, operating temperatures fall in the approximate range of 350° C. to 550° C., and more particularly in the range of 400° C. to 500° C. Specifically, with a catalyst consisting of 10% vanadium oxide on alundum, satisfactory results have been obtained with a maximum operating temperature of 475° C., the integrated mean reaction temperature being about 440° C. With bismuth vanadate an operating temperature of about 375° C. may be used and with tin vanadate a temperature of only 275° C. gives satisfactory results.

A contact time of from 0.15 to 0.50 second is usually employed and operating pressures are usually low, for example 1 to 2 atmospheres.

The preparation of phthalic anhydride from naphthalene is highly exothermic. From the principal oxidation reaction plus secondary oxidation reactions that occur there is obtained in the neighborhood of 8950 B. t. u. per pound of naphthalene charged. This large amount of heat must be removed if reaction temperature is to be controlled. As mentioned previously, part of this is removed by heating the enormous excess of air to reaction temperature. The remaining heat is usually removed by vaporizing mercury. The selected contact agent is disposed in a plurality of small tubes which are surrounded with mercury. These tubes may, for example, be square, measuring ¾ inch by ¾ inch, inside dimensions. Two objects are accomplished by passing the reactants in parallel through a plurality of small tubes. In the first place, a large tube surface area is presented per unit volume of catalyst and hence a large amount of heat may be transferred to the cooling medium at a comparatively low heat transfer rate. Secondly, with small tubes, no catalyst particle is far distant from a heat transferring surface and accordingly the temperature gradient over a transverse section of the catalyst bed is not excessive.

The exothermic heat of reaction which is not removed by the hot reaction products, is transferred through the tube walls to the surrounding mercury bath. The heat absorbed by the mercury brings about the partial vaporization thereof, the mercury vapors rise into a plurality of finned reflux tubes exposed to the atmosphere, the vapors are condensed and the resulting liquid mercury refluxed to the mercury reservoir surrounding the reaction tubes. The boiling point of the mercury and accordingly the mean reaction temperatures may be varied over comparatively wide limits by applying pressure to the mercury reservoir, for example by applying thereto an inert gas such as carbon dioxide or nitrogen under the requisite pressure. Obviously, if very low temperature operation is desired the mercury may be boiled at subatmospheric pressure. Roughly, in normal operation about one third of the exothermic heat of reaction is removed by the reaction products and two thirds by the vaporization of mercury.

Other liquids may be used as heat transfer media. Among these may be mentioned the well known, low melting, nitrate-nitrite bath, aluminum chloride-sodium chloride mixtures and aluminum chloride-ferric chloride-sodium chloride mixtures. When operating with very active catalysts at very low temperatures, diphenyl, diphenyl oxide, or mixtures of the two may be employed. With these media heat removal is not due to vaporization, but instead, heated heat transfer medium is continuously removed from around the reaction tubes, cooled in an outside exchanger and returned to the space around the reaction tubes.

In addition to the preparation of phthalic anhydride by the partial catalytic oxidation of naphthalene, it is also well known in the art to prepare phthalic anhydride by the partial catalytic oxidation of monomethyl naphthalenes as disclosed in U. S. Patent 1,591,619, issued July 6, 1926, to H. D. Gibbs. That monomethyl naphthalenes should give phthalic anhydride by partial catalytic oxidation is not surprising, in fact, on the basis of theoretical organic chemistry, one would expect that the presence of a methyl group on one of the rings of the naphthalene molecule would render said ring more reactive and facilitate its rupture during partial catalytic oxidation.

I have found, contrary to expectation, that polyalkyl naphthalenes give phthalic anhydride on partial catalytic oxidation even if there is one or more alkyl substituent on each ring of the naphthalene molecule. On the basis of theoretical organic chemistry it would be expected that on the partial catalytic oxidation of a polyalkylated naphthalene having at least one alkyl group on each ring of the naphthalene molecule, one or more of the following reactions would occur:

a. Both rings of the naphthalene molecule would rupture with the eventual production of maleic anhydride.

b. One ring of the naphthalene molecule would rupture while the alkyl group (or groups) on the other would be oxidized, giving a carboxylated phthalic anhydride.

c. One ring of the naphthalene molecule would rupture while the other ring with its alkyl group (or groups) would remain intact, producing an alkylated phthalic anhydride.

As a matter of fact, not one of the above outlined reactions occur, at least not to any appreciable extent. Instead, I have found that such polyalkylated naphthalenes as 1,5 dimethyl naphthalene and 2,6 dimethyl naphthalene give phthalic anhydride on partial catalytic oxidation.

Furthermore, I have found that certain fractions of catalytically reformed naphtha are an excellent source of polyalkylated naphthalenes. In the catalytic reforming of naphtha, the naphtha charge, having a boiling range of 225° F. to 440° F., for example, is heated to a high temperature, for example, 925 to 1025° F. more or less, and is then passed over a suitable naphtha reforming catalyst. Among such catalysts may be mentioned the oxides of such elements as chromium, molybdenum, vanadium, titanium and zirconium. Particularly active catalysts are prepared by mounting a relatively small amount of one or more of the above oxides on activated alumina as exemplified by 10% chromium oxide on activated alumina, or 6% molybdenum oxide on activated alumina. To retard catalyst deactivation due to the deposition of carbon or carbonaceous residues thereon, it is common practice to charge the selected naphtha to the catalytic reactor in admixture with a relatively large volume of hydrogen under moderate pressure, for example, 300 pounds per square inch.

The reaction products from the above briefly described catalytic reforming operations are worked up as usual to produce hydrogen rich gas (part of which may be recycled as previously noted), high octane material in the gasoline boiling range and bottoms, the exact amount of bottoms produced depending upon the nature of the naphtha charge (e. g., naphthenic or paraffinic), the boiling range of the naphtha charge, the age of the catalyst, the exact operating conditions and other factors. In general, 2% by volume or more of bottoms based on charge are produced under typical conditions. These bottoms are very heavy, having an A. P. I. gravity of 8.9 or thereabouts and an A. S. T. M. distillation exemplified by the following data:

| | °F. |
|---|---|
| Initial | 453 |
| 10% | 484 |
| 50% | 516 |
| 90% | 654 |
| Max | 752 |

On fractionating bottoms similar to the sample described, some naphthalene is to be found in the first 5% overhead while considerable monomethyl naphthalenes are to be found in the next 5 to 10 or 5 to 15% overhead. After thus removing naphthalene and monomethyl naphthalenes, a third overhead cut may be taken with the elimination of about 40% residue. This third overhead cut, representing 45 to 50% of the total bottoms, is rich in dimethyl naphthalenes, especially the 2,6 and 1,5 isomers, containing some 80 to 85% of dimethylnaphthenates. This third overhead cut is eminently suited for use as charging stock in the instant invention.

If desired, the dimethyl naphthalene content of this third overhead fraction may be further increased by any suitable procedure or combination of procedures, for example, accurate fractionation and blending of appropriate cuts, azeotropic distillation, or solvent extraction. As an example of solvent extraction, the third overhead cut may be diluted with 2 volumes of a predominantly paraffinic hydrocarbon fraction, for example, normal hexane, and an extract containing about 95% dimethyl naphthalenes may be obtained using about 0.6 volume of nitromethane as selective solvent. Phenol may be used as selective solvent if desired.

To aid in the understanding of this invention, reference may be had to the accompanying drawing forming a part of this application and wherein Figure 1 is a simplified diagrammatic representation of one form of apparatus suitable for accomplishing the objects of this invention, Figure 2 is a simplified diagrammatic representation of another form of apparatus suitable for accomplishing the objects of this invention, Figure 3 is a simplified diagrammatic representation of a modified form of reactor suitable for accomplishing the objects of this invention.

Turning now to a more detailed consideration of Figure 1, that portion of catalytic reformer bottoms representing a 10% to 60% overhead fraction from the total bottoms is placed in vaporizer 11. Air at six pounds per square inch gage pressure enters through line 1 at a rate of 6880 g. per hour and is divided as shown, 1580 g. per hour primary air passing through valve 2, and 5300 g. per hour secondary air passing through valve 3. The quantity of primary air and secondary air is measured by means of orifice plates 4 and 5 and manometers 6 and 7 respectively, and primary air temperature is measured by means of a thermometer 8. The primary air is passed through preheater 9 which may be in the form of a coil surrounded by steam and wherein the primary air is heated to a temperature of 115° C., and it is then introduced into vaporizer 11 by distributing ring 10 to vaporize the bottoms cut contained therein, which may be maintained at 115° C. by means of a steam jacket.

The bottoms cut in vaporizer 11 may be evaporated at an average rate of 149 g. per hour and carried in the primary air stream to point 13 where it joins with secondary air which has also been heated to 115° C. in preheater coil 12. The mixture passes to convertor 14.

Convertor 14, in one of many forms which may be employed, contains nine catalyst tubes, 18 inches long and ¾ inch by ¾ inch internal dimensions with ⅛ inch walls, and welded into top and bottom tube sheets. A nine inch section of each tube is packed with catalyst which may consist of about 10% vanadium oxide on low alkali alundum. Mercury may surround the tubes and serve as a cooling bath so that the exothermic heat of reaction generated within the individual tubes is transferred through the tube walls and into the mercury, part of which is vaporized thereby. Mercury vapors rise into mercury reflux lines 18 and 19 wherein the vapors are condensed and fall back to the space surrounding the reaction tubes. The boiling point of the mercury may be regulated by the imposition of pressure thereon, for example, by means of carbon dioxide (or similar inert gas, e. g. nitrogen) added by line 20.

In the operation of the process being considered the mercury boiling point was fixed at approximately 400° C. by application of carbon dioxide pressure (15 pounds per square inch) to the mercury reservoir. Under these conditions the reaction temperature as measured by a thermocouple in the catalyst in one of the reaction tubes varied from 409° C. to 420° C.

Reaction products passed through valve 15 wherein reduction in pressure to atmospheric occurred and thence to condenser 16 which consists of a large box provided with some suitable arrangement of baffles. Due to the reduction in velocity, to cooling, and to changes in direction of the gas flow induced by the baffles, practically all of the solid reaction product (phthalic anhydride) was deposited in the condenser.

During a 3-hour run in which 440 g. of a 10 to 60% overhead cut from catalytic reformer bottoms was charged, a total of 135 g. crude phthalic anhydride (solidification point 123.5° C.) was obtained, equivalent to a yield of 30.7 parts by weight of this product per 100 parts by weight of charge. The charge contained only about 80% dimethyl naphthalenes and during oxidation the two methyl groups were lost; therefore 440 g. of charge contained only about 228 g. equivalent naphthalene. On this basis, about 48 pounds phthalic anhydride were obtained per 100 pounds equivalent naphthalene charged.

In a parallel experiment on the same apparatus and charging naphthalene (78° C.) a phthalic anhydride yield of 57 pounds per 100 pounds charge was obtained.

It is obvious that the data presented above represent results obtained with a small laboratory unit. It is well known to those skilled in the art that in general small scale laboratory equipment is not exactly comparable in all respects to commercial installations. For example, in the laboratory experiments described the convertor was actually heated electrically to maintain temperature. Due to the large surface to volume ratios of small pieces of equipment, radiation effects are much more pronounced with these than with large commercial installations, hence the necessity for electrical heating. When conducting reactions on the commercial scale, heat removal becomes a problem, as has already been mentioned, and especially so when polyalkyl naphthalenes or fractions obtained from catalytic reformer bottoms are charged, because heat is evolved not only from the oxidation reaction leading to the formation of phthalic anhydride but also from the destruction of the alkyl groups. With fractions from catalytic reformer bottoms, the portions thereof that are not polyalkyl naphthalenes are also oxidized with the production of heat. These extra heat sources are compensated for to a certain extent due to the fact that usually a higher air to charge ratio is employed when using polyalkyl naphthalenes or catalytic reformer bottoms fractions than when naphthalene is charged, but even so, a large additional load is thrown on the mercury heat removal system. While mercury type convertors similar to that described in connection with Figure 1 may be used where charging polyalkyl naphthalenes or catalytic reformer bottoms on the commercial scale, I have found that more satisfactory results may be obtained by using a fluid catalyst type convertor such as is shown somewhat diagrammatically in Figure 2.

In the apparatus shown in Figure 2, a suitable portion of catalytic reformer bottoms, for example, a 10 to 60% overhead cut therefrom, is brought up to a pressure of 30 pounds per square inch or thereabouts by pump 21 and is passed by line 22 to vaporizer 23. This vaporizer may be provided with disc and doughnut trays 24 or other suitable means to insure liquid-vapor contact.

The liquid charge to the vaporizer is preferably at a moderately elevated temperature, for example, 115° C. Air, introduced through line 25, is brought up to a pressure of 30 pounds per square inch or thereabouts in compressor 26 and a portion thereof is sent by valved line 27 through heater 28 and thence to vaporizer 23. The air is brought up to a moderately elevated temperature, for example 115° C. in heater 28 and at least sufficient air is added to vaporizer 23 to evaporate the liquid charge introduced therein. Any nonvolatile polymers or material of similar nature may be removed from vaporizer 23 by valved line 29 either continuously or from time to time.

Preheated air bearing vaporized liquid charge passes by line 30 to fluid catalyst reactor 31. The catalyst space 32 of reactor 31 is filled with a suitable contact agent of an appropriate particle size to facilitate the fluidizing thereof. The catalyst forms a fluidized bed or bed of fluidized catalyst by which terms I mean a mass of finely divided solid catalyst which is maintained in the reactor in agitated but substantially continuous phase. Among such suitable catalysts may be mentioned 10% vanadium pentoxide on 200 mesh low alkali alundum, 6% molybdenum oxide on 200 mesh low alkali alundum and the like. On passage through catalyst space 32 the vaporized liquid charge is partially oxidized, forming large amounts of phthalic anhydride. As mentioned previously, time of contact in this oxidation reaction is usually rather short, for example, 0.5 second or less. On the other hand, in order to maintain catalyst bed 32, lineal velocity therethrough must not exceed a certain limiting value in the neighborhood of 3 feet per second. Restrictions imposed by contact time and lineal velocity rather definitely fix the size and shape of catalyst space 32. This catalyst space is usually pancake shaped. For example, in one commercial unit this catalyst space is 4.65 feet in diameter and 1.8 feet high. Of course, if desired, catalyst space 32 may be broken up into a plurality of smaller catalyst spaces of more orthodox shape and the reactants distributed among them.

It is also obvious that a reactor of more nearly orthodox shape results if the contact time is greatly increased. For example, it has been found that contact time may be increased by five fold to as much as ten fold by reducing the operating temperature 50° C. to 100° C. or thereabouts. This brings about a corresponding increase in the depth of the catalyst bed in the reactor and results in a reactor of more nearly conventional shape.

Reaction products, containing some entrained catalyst, leave through valved line 33 and are preferably immediately cooled in 34 to prevent post-reaction ignition. Reactants are not cooled below the dew point, however, which is in the neighborhood of 135° C. for the system being considered. Cooled products are then passed to cyclone separator 35 or similar device to remove most of the entrained catalyst therefrom. The resulting cooled and deentrained products are sent by line 36 to a condenser (not shown) which may take the form of the large box-like baffled structure previously described and wherein crude phthalic anhydride is deposited. The crude phthalic anhydride is removed from the condenser from time to time and may be purified if desired, for example, by vacuum distillation.

Alternatively, the reaction products, after separation of entrained catalyst as described, may be further cooled and passed to a conventional separator wherein phthalic anhydride separates as a liquid phase and gaseous reaction products as an upper gas phase. The liquid phthalic anhydride may be discharged from the bottom of the separator to the previously mentioned vacuum still while the gas phase may be removed from the top of the separator and discharged. When operating in this way it is preferable to maintain pressure until after the separation step.

To maintain the reaction temperature in the catalyst space 32 at the desired level, fluidized catalyst is withdrawn from the fluid catalyst bed at a rapid and controlled rate through valved line 37, is conveniently mixed with separated catalyst from cyclone 35 added through line 38 and the whole is passed through cooler 39. This cooler may take the form of a tubular heat exchanger, the tubes of which are surrounded by steam introduced through line 40 and leaving through line 41. Cooled catalyst passes via line 42 to temporary storage 43 from which catalyst is removed through valved line 44, is picked up by secondary air introduced by valved line 45 and is returned to reactor 31 by means of line 46.

Catalyst circulation from reactor 31 through cooler 39 and back to reactor 31 must be very rapid in order to maintain the desired reaction temperature in reactor 31. Indicative of the rapidity of this circulation, in a commercial unit, as near as can be calculated, catalyst was completely changed in the reactor about every three to five minutes or thereabouts, the cooling achieved in the cooler being about 450° F.

If desired, the reactor and cooler may be combined in one piece of equipment as illustrated in Figure 3. This results in a more compact apparatus and some saving in construction cost. In Figure 3, reactor 104 contains the fluidized catalyst bed 105. Passing through this bed are a plurality of cooling tubes which are fixed in the two tube sheets 106 and 107. Cooling medium enters through line 108 and leaves through 109. Air carrying the vaporized liquid charge is introduced through line 110 and passes through the perforated support for the catalyst bed, and the reaction products and residual air pass out through line 111.

A reactor-cooler combination such as shown in Figure 3 is especially desirable when operating at long contact times where a deep catalyst bed is employed. In such a case the cooler may be disposed primarily in the upper part of the catalyst bed.

While operations with a fluidized catalyst have been explained in connection with the conversion of dimethyl naphthalenes to phthalic anhydride, as will be evident to those skilled in the art, this general process is of much wider application. For example, by minor changes that will be evident to those skilled in the art, it is possible by use of the fluidized catalyst technique to convert methyl naphthalenes and/or naphthalene to phthalic anhydride, to convert xylenes to phthalic, terphthalic and isophthalic acids or anhydrides, or under more severe oxidation conditions, to convert xylenes to benzoic acid and finally maleic anhydride. Furthermore, by this means it is possible to convert anthracene to anthraquinone. Also, by this procedure, it is possible to convert toluene to benzaldehyde or benzoic acid, benzaldehyde to benzoic acid and benzene to maleic anhydride.

Similar conversions are possible in the aliphatic series using fluidized catalysts. For example, individual paraffin hydrocarbons may be converted to the corresponding aldehydes (or ketones) and acids by this means. The manufacture of formaldehyde from methane is easily accomplished by the fluidized catalyst technique and, if the compound is desired, formic acid may be made. Similarly, acetaldehyde or acetic acid may be obtained from ethane, butyraldehyde from butane, et cetera. Furthermore, hydrocarbon mixtures may be oxidized using a fluidized catalyst. For example, by oxidizing a hydrocarbon mixture of the nature of light naphtha, and having a boiling range of about 100 F. to 225° F., a liquid reaction product is produced from which an excellent nitrocellulose solvent may be obtained, for example, by extraction with aqueous furfuryl alcohol.

Alcohol oxidations may also be conducted in the presence of a fluidized catalyst. For example, by the application of this technique, acetone has been obtained by the oxidation of isopropyl alcohol, formaldehyde (and formic acid) from methanol, acetaldehyde (and acetic acid) from ethanol, propionaldehyde from n-propyl alcohol and butyraldehyde from n-butanol.

If desired, it is possible to combine phthalic anhydride manufacture with a fluidized catalyst with a catalytic naphtha reforming process in which the same catalyst in fluidized state is used.

Again referring to Figure 2, a suitable heavy naphtha, for example, a virgin petroleum fraction having a boiling range of 250° F. to 440° F. enters by line 47 and is brought up to a pressure of about 300 pounds per square inch by pump 48, the charge then passing through coil 49 in furnace setting 50 wherein it is heated to a temperature of 1025° F., more or less. Hydrogen rich gas, from a source hereinafter described, and at a pressure of about 300 pounds per square inch, passes from line 51 through coil 52 in furnace setting 50 wherein it is heated to a temperature of 1060° F., more or less. In general, about 2800 cubic feet hydrogen rich gas (gas containing in the neighborhood of 60% hydrogen) are used per barrel of heavy naphtha charged. Heated heavy naphtha and heated hydrogen rich gas leave furnace setting 50 by lines 53 and 54 respectively, join at 55 and thence pass to reactor 56. Reacter 56 contains a combination catalytic reforming-oxidizing catalyst, for example, 6% molybdenum oxide on low alkali alundum, in the fluidized state. A large proportion of the heavy naphtha charge is cyclicized during passage through reactor 56. Reaction products containing a small amount of entrained catalyst leave reactor 56 by line 57, may be somewhat cooled, if desired, in exchanger 58, and then pass to cyclone separator 59 or similar suitable device wherein entrained catalyst is separated. Reaction products leave cyclone 59 by line 60, are cooled or further cooled in exchanger 61 and then pass to separator 62. Hydrogen rich gas is removed from separator 62 by line 63, is slightly compressed by compressor 64 and a portion thereof is sent by valve 65 to line 51 for recycling. If desired, the hydrogen content of the gas discharged from separator 63 or any part thereof may be increased by subjecting the gas to a conventional adsorption-stripping operation.

Liquids from separator 62 are removed therefrom preferably with same pressure reduction through valve 66 and are passed by line 67 through heater 68 to still 69. Still 69 is conventional, being provided with means to facilitate liquid vapor contact, for example, trays 70, lower disposed heating means, for example, coil 71, and upper disposed cooling means, for example, coil 72. Overhead from tower 69, comprising material of gasoline endpoint, passes by line 73 to cooler 74 and thence to separator 75. Uncondensed material leaves separator 75 by valved line 76 and gasoline constituents may be recovered therefrom by further cooling, by conventional adsorption-stripping, etc., if desired. Condensed material is moved by pump 77, part passing by valved line 78 to tower 69 to provide open reflux therein while net gasoline product passes by valved line 79 to storage.

Bottoms from tower 69 are moved by pump 80, are preferably heated in exchanger 81 and then pass to tower 82. Tower 82 is conventional, being similar to tower 69, previously described, but considerably smaller in size. Catalytic reformer bottoms are fractionated therein and a 10 to 15% overhead fraction, containing most of the naphthalene and monomethyl naphthalenes, is eventually removed via valved line 83. An intermediate cut, representing a 10 to 60% or 15 to 60% overhead cut from the bottoms is removed as a side stream through line 84 and passes to pump 21 for processing, as already described. Bottoms obtained from fractionating catalytic reformer bottoms are eliminated through valved line 85. If desired, the first 10 to 15% overhead cut obtained from catalytic reformer bottoms may be mixed with the heart cut by closing valve 83 and opening valve 86.

Returning now to reactor 56: The catalytic reforming reaction is endothermic so no cooling of the fluidized catalyst mass is necessary, in fact, the application of heat thereto is advisable. However, catalyst employed in reforming requires regeneration, since the activity thereof falls to uneconomic levels after about 1 to 10 hours. With naphthas high in sulfur and/or nitrogen, regeneration is required every hour or so, while with low sulfur and low nitrogen heavy naphthas, regeneration is necessary every 5 to 10 hours or thereabouts. Accordingly, the average catalyst holding time in catalytic reforming may be 1 to 10 hours while in catalytic oxidations it is a matter of minutes. I have found that reforming catalyst may be conveniently regenerated simultaneously with the catalytic oxidation of the bottoms formed during the catalytic reforming reaction.

Catalyst is removed from reactor 56 by valved line 87 at such a rate that the total catalyst content of reactor 56 is removed every hour to 10 hours, depending upon the regeneration frequency required. Catalyst separated in cyclone 59 is added thereto through line 88. The catalyst to be regenerated passes through valve 89 and line 90 to reactor 31 wherein regeneration occurs. Regenerated catalyst is removed from reactor 31 by line 91 and valve 92 at the same or approximately the same rate as catalyst to be regenerated is added to reactor 31. Withdrawn regenerated catalyst gradually fills vessel 93, and when the vessel is full, or practically so, valve 92 is closed and 94 is opened, valve 97a is closed, and vessel 95 is filled. At the same time, valve 96 and valve 97 are opened. Valve 96 allows hydrogen rich gas from compressor 64, valve 98 and line 99 to pass into vessel 93 while valve 97 allows regenerated catalyst to flow into hydrogen rich gas stream in line 99 and thence back to reactor 56. Valves 100 and 101 allow pressure in vessels 93 and 95 to be released. The manipulations necessary to secure continuous or practically continuous catalyst transfer from vessels 93 and 95 to reactor 56, should be evident to those skilled in the art.

One vessel is purged to reduce pressure therein. It is then filled with regenerated catalyst. Pressure is put on the vessel and the catalyst is moved to the reactor. When all catalyst has been removed, pressure is reduced again and the cycle of operations repeated. With two or more vessels operating properly out of phase, continuous or practically continuous operation is achieved.

If desired, catalyst removed from reactor 56 for regeneration in reactor 31 may be cooled prior to passage to reactor 31. This may be accomplished by closing valve 89 and opening valve 102 whereby catalyst to be regenerated passes through cooler 103 prior to entering reactor 31. Cooler 103 is similar to cooler 39 but is smaller. Generally, the rate of catalyst removal from reactor 56 is so slow that cooling is not necessary, but in some cases, for example, when catalyst holding time in reactor 56 is only an hour or so, cooling is advisable.

In the previous descriptions, operations with straight air have been dealt with. In the oxidation of naphthalene and alkylated naphthalenes a very high air to hydrocarbon ratio is employed in order to keep below the explosive limits of the mixture. For example, in naphthalene oxidation, 25 pounds of air or more are generally used per pound of naphthalene. This represents about 500% excess of air. Obviously, use of this large excess of air results in low production of oxidation product per unit volume of reactor space and increases the difficulties of complete product recovery. I have found that considerable improvement in these respects results if dilute air rather than straight air is used in oxidation. For example, and again considering naphthalene as a typical, simple example, one pound of naphthalene theoretically requires about 5.1 pounds of air for oxidation to phthalic anhydride. Instead of diluting this theoretical mixture with additional air to move outside the explosive limits, I have found that a lesser amount of inert gas can be used to accomplish the same purpose. Such inert gas may be obtained conveniently from the stacks following the phthalic anhydride condenser train. Illustrative of such operations, a mixture of 1 pound of naphthalene, the equivalent of 7.5 pounds of air and 7.5 pounds inert combustion gas does not appear to explode and gives results comparable to those obtained with one pound naphthalene and 25 pounds of straight air.

As is well known to those skilled in the petroleum art, catalytically reformed naphtha is rich in aromatics such as toluene, the xylenes, naphthalene, methyl naphthalenes, dimethyl naphthalenes, anthracene and the like. While Figure 2 has been described in connection with the catalytic partial oxidation of a cut rich in dimethyl naphthalenes and obtained from catalytically reformed naphtha, it will be obvious to those skilled in the art that by minor obvious changes any aromatic component or combination thereof may be subjected to catalytic partial oxidation. For example, a xylene cut, obtained from the overhead from tower 69, may be partially oxidized catalytically to give a mixture of dibasic acids and anhydrides.

It is obvious that Figures 1, 2, and 3 are much simplified diagrammatic illustrations and many minor but nevertheless highly desirable or essential elements have been omitted for purposes of simplification. For example, when transferring catalyst from a hydrocarbon medium (or a hydrogen medium) to an oxygen containing medium or vice versa, it is highly desirable that absorbed and/or adsorbed hydrocarbons (or hydrogen) be removed from the catalyst, for example, by steaming, before adding to the oxygen containing medium or vice versa. Methods and means for accomplishing this are not shown in Figure 2 and many other similar desirable or essential operations and means which will be obvious to those skilled in the art have not been shown in the figures or described in connection therewith.

Fluidized catalyst operations are made possible by the fact that certain finely divided powders, among them being alumina in its many varieties, certain clays, silica and the like, behave like liquids when the individual particles are coated by an adsorbed layer of gas. When in the fluidized state, these powders can be pumped, can be moved by a gas lift and will flow through piping just as a liquid. For further information on certain aspects of this phenomenon, reference may be had to United States Reissue Patent 21,526, issued August 6, 1940, to W. W. Odell.

Be it remembered that the instant invention, while described in connection with certain specific examples and embodiments thereof, is in no way to be limited thereto except insofar as such may be set forth in the accompanying claims.

Having thus described my invention what I claim as new and desire to secure by Letters Patent is:

1. A process for the preparation of phthalic anhydride from a petroleum fraction of the nature of heavy naphtha comprising, in combination, vaporizing said petroleum fraction, passing the resulting vapors through a first fluidized bed of catalyst, exhibiting combined reforming and oxidizing properties, at reaction temperature for a time sufficient to effect extensive aromatization of said petroleum fraction, separating a fraction rich in dimethyl naphthalenes from the reaction products, vaporizing said fraction rich in dimethyl naphthalenes, passing the resulting vapors, in admixture with a gas containing free oxygen, through a second fluidized bed of catalyst, exhibiting combined reforming and oxidizing properties, at reaction temperature for a time sufficient to effect substantial conversion of said dimethyl naphthalenes to phthalic anhydride, passing catalyst from the first fluidized bed of catalyst to the second fluidized bed of catalyst to accomplish the regeneration thereof, passing regenerated catalyst from the second fluidized bed of catalyst to the first fluidized bed of catalyst, and cooling said last mentioned catalyst to maintain the reaction temperature substantially constant therein.

2. A process for the preparation of phthalic anhydride from a petroleum fraction of the nature of heavy naphtha comprising, in combination, vaporizing said petroleum fraction, passing the resulting vapors through a first fluidized bed of catalyst, exhibiting combined reforming and oxidizing properties, at reaction temperature for a time sufficient to effect extensive aromatization of said petroleum fraction, separating a fraction rich in dimethyl naphthalenes from the reaction products, vaporizing said fraction rich in dimethyl naphthalenes, passing the resulting vapors, in admixture with a gas containing free oxygen, through a second fluidized bed of catalyst, exhibiting combined reforming and oxidizing properties, at reaction temperature for a time sufficient to effect substantial conversion of said dimethyl naphthalenes to phthalic anhydride, passing catalyst from the first fluidized bed of catalyst to the second fluidized bed of catalyst to accomplish the regeneration thereof, passing regenerated catalyst from the second fluidized bed of catalyst to the first fluidized bed of catalyst, removing catalyst from the second fluidized bed of catalyst, cooling said removed catalyst and returning the resulting cooled catalyst to the second fluidized bed of catalyst whereby reaction temperature is maintained essentially constant therein.

ROBERT F. RUTHRUFF.

REFERENCES CITED

The following references are of record in the file of this patent:

UNITED STATES PATENTS

| Number | Name | Date |
|---|---|---|
| 1,836,325 | James | Dec. 15, 1931 |
| 1,674,589 | Caspari | June 19, 1928 |
| 2,257,920 | Sachanen | Oct. 7, 1931 |
| 2,223,133 | Sachanen | Nov. 26, 1940 |
| 1,992,691 | Ellis | Feb. 26, 1935 |
| 1,516,756 | Weber | Nov. 25, 1924 |
| 2,294,130 | Porter | Aug. 25, 1942 |
| 1,591,619 | Gibbs | July 6, 1926 |
| 2,180,353 | Foster | Nov. 21, 1939 |
| 2,309,034 | Barr | Jan. 19, 1943 |
| 2,256,969 | Barr | Sept. 23, 1941 |
| 2,117,359 | Porter | May 17, 1938 |
| 2,231,231 | Subkow | Feb. 11, 1941 |
| 2,253,486 | Belchetz | Aug. 19, 1941 |
| 2,231,424 | Huppke | Feb. 11, 1941 |
| 1,984,380 | Odell | Dec. 18, 1934 |
| 1,799,858 | Miller | Apr. 7, 1931 |
| 2,311,564 | Munday | Feb. 16, 1943 |
| 2,373,008 | Becker | Apr. 3, 1945 |

FOREIGN PATENTS

| Number | Country | Date |
|---|---|---|
| 479,017 | Great Britain | Jan. 19, 1938 |

OTHER REFERENCES

Marek-Hahn—Catalytic Oxidation of Organic Compounds, pp. 406–420.